May 10, 1966  D. W. BARTON ETAL  3,250,147
VARIABLE RATIO STEERING GEAR
Filed Dec. 9, 1963  2 Sheets-Sheet 1

DAVID W. BARTON
WARREN A. VAN WICKLIN, JR.
INVENTORS

BY John R. Faulkner
Reich L. Jerschling
ATTORNEYS

United States Patent Office 3,250,147
Patented May 10, 1966

3,250,147
VARIABLE RATIO STEERING GEAR
David W. Barton, Birmingham, and Warren A. Van Wicklin, Jr., Dearborn, Mich., assignors to Ford Motor Company, Dearborn, Mich., a corporation of Delaware
Filed Dec. 9, 1963, Ser. No. 328,832
2 Claims. (Cl. 74—509)

This invention relates to a variable ratio steering gear and more particularly to a variable ratio steering gear that may employ fluid power assist.

The invention of this application is an improvement on the variable ratio steering gear disclosed in co-pending application S.N. 319,189, filed October 28, 1963, now Patent 3,209,610, in the name of Warren A. Van Wicklin, Jr., and assigned to the assignee of this invention. That application discloses a variable ratio steering gear in which an internal annular groove is positioned in an output member to surround the worm driven by the input member of the steering gear. The worm is of the double thread type and has two grooves displaced relative to one another. The output member carries a pair of balls positioned in the annular groove with one ball located in each of the grooves in the worm. The two grooves in the worm are made with variable lead angles with the smallest or minimum lead angle being positioned in the center of the worm and increasing toward each end of the worm. This provides a variable ratio steering gear in which slow steering or high ratio steering is provided in the on-center position of the gear and low ratio or faster steering is provided on either side of center.

That application also discloses the above-described mechanism adapted to an in-line type integral power steering gear in which the annular groove is formed on the internal portion of the piston to provide a variable ratio power assisted steering gear.

The present application is directed to an improvement on the mechanism described above and shown in the aforementioned co-pending application of Warren A. Van Wicklin, Jr. The mechanism disclosed in that application may have a slight disadvantage if used with present day steering wheels because the on-center position of the steering wheel may drift as a function of the amount of steering accomplished. This may be caused by travel of the balls within the annular groove in a manner similar to planet gears, thereby reducing the axial displacement of the piston. Also, because of manufacturing tolerances and different road conditions, the effective radius of the ball contact on the worm may vary and thus affect the planetary ratio a small amount during steering maneuvers. The variation may be additive during a period of time and, therefore, may cause some drift. The steering gear disclosed in the above application, of course, functions in a perfectly satisfactory manner with any steering system, but with a steering wheel designed with a fixed center position, it may cause some difficulty from an appearance standpoint.

The present invention provides two ball followers carried by the output member, or by the power piston in a power assisted gear, in fixed position on the output member or the power piston. The same type of worm is employed as that described in the above-mentioned application, and by fixing the position of the two ball followers in the output member or power piston the center position of the steering gear will remain always the same.

The structure to provide the fixed position of the two ball followers comprises an antifriction bearing assembly carrying each ball follower. These antifriction bearing assemblies are positioned on a line that is perpendicular to and intersects the axis of the worm. Means are provided for adjusting these antifriction bearing assemblies axially along this line to compensate for manufacturing tolerances and errors.

This variable ratio steering gear has all the advantages enumerated in the above-mentioned patent application. In addition it has advantages over that steering gear in providing a fixed on-center position of the steering wheel and providing a means for adjustment of the ball followers to compensate for manufacturing errors and tolerances.

An object of the invention is the provision of a variable ratio steering gear in which the on-center position of the steering wheel is fixed in relation to the steerable road wheels of the vehicle.

Another object of the invention is the provision of a variable ratio steering gear in which the forces on the input and output members are substantially balanced.

Another object of the invention is the provision of a variable ratio steering gear that can be readily adjusted to compensate for manufacturing tolerances and errors.

A further object of the invention is the provision of a variable ratio steering gear that is reliable, inexpensive and easy to assemble.

Other objects and attendant advantages of this invention will become more fully apparent as the specification is considered in connection with the attached drawings in which.

Figure 1:
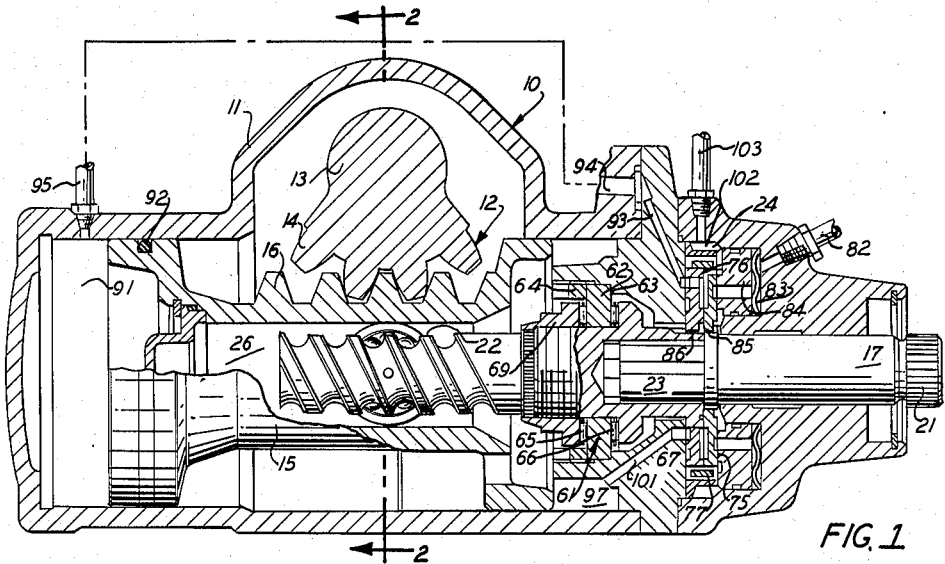
FIGURE 1 is a longitudinal sectional view of the power steering gear of the present invention.

Referring now to the drawings in which like reference numerals designate like parts throughout the several views thereof, there is shown in FIGURE 1 a steering gear 10 that includes a housing 11. This housing 11 has mounted therein an output group 12 that includes an output shaft 13 having a sector gear portion 14 and a power piston 15 having a rack 16 that engages the sector gear portion 14. Thus reciprocatory motion of the power piston 15 is converted to rotary motion at the output shaft 13 by means of the sector gear portion 14 and the rack 16.

The input group or member 17 of the steering gear 10 includes an input shaft 21 and a worm member 22. In a manual type steering gear these two members may be formed integrally or fastened together by any suitable means. In the power steering gear shown, they are coupled through the lost motion connection 23. This may take the form of a loose spline connection that may have a few degrees of lash. The input shaft 21 and the worm member 22 are also coupled through a fluid control valve 24 that will be described in detail subsequently. The rotary motion of the worm member 22 must be converted into reciprocatory or translatory motion of the power piston 15, and in this invention this is accomplished by the structure shown in FIGURES 2 and 3. The power piston 15 envelopes the active portion of worm 22 with this portion of the worm member 22 fitting into a chamber 26 formed coaxially within the power piston 15.

The worm member 22 is of the double thread type in which two grooves 27 and 28 having variable lead angles are cut. These grooves are displaced in phase by 180° so that they are diametrically opposite each other on the worm and they have identical lead angles at every section normal to the worm axis. The lead angles are a minimum at the center position of the worm, and they increase progressively toward each end of the worm. At a center position on the worm to the ends of the grooves the lead angles are constant. A ball follower 31 is positioned in the groove 27, while a second ball follower 32 is positioned in the groove 28.

These two ball followers 31 and 32 are carried by the power piston 15 and are positioned in the grooves 27 and 28 by a pair of antifriction bearing assemblies 33 and 34 respectively. The antifriction bearing assembly 34 comprises an outer race 35 positioned in a stepped bore 36 in the power piston 15. This stepped bore 36 provides a shoulder 37 for positioning the center of the outer race 35 on a line that is perpendicular to and intersects the axis of the worm member 22. It can be understood from this statement that the center of the stepped bore 36 is positioned on this line. The outer race 35 carries an inner race button 41 by means of a full complement of ball bearings 42. This inner race button 41 has an ogival cavity 44 positioned therein for reception of the ball follower 32. This ogival cavity permits the ball follower to revolve freely in the inner race button 41.

The antifriction bearing assembly 33 is identical with the antifriction bearing assembly 34 in that it includes an outer race 46, an inner race button 47 and a full complement of ball bearings 48. The outer race 46 is received in a bore 49 the center of which is positioned on the same line as the center of the stepped bore 36. Thus, the two bores 49 and 36 that receive the outer races 35 and 46 of the antifriction bearing assemblies 33 and 34 respectively are coaxial with respect to one another and their centers are positioned on a line that is perpendicular to and intersects the axis of the worm member 22.

The antifriction bearing assembly 33 is adjustable along the line that is perpendicular to and intersects the axis of the worm 22. This is accomplished by placing a threaded bore 51 in the power piston 15 for reception of an adjusting nut 52 and a locking nut 53 that may each have internal hexagonal portions 55 and 56 for the reception of an Allen-type wrench.

The worm member 22 is positioned axially and radially within the housing 11 of the power steering gear 10 by means of a thrust and radial bearing arrangement 61 that is positioned near one end of the worm member 22 and in spaced relation from the grooves 27 and 28 on the worm member that engages the ball followers 31 and 32. This thrust and radial bearing arrangement 61 includes a fixed plate 62 that is positioned against shoulder 63 in the housing 11 by means of a lock ring 64. This fixed plate 62 provides a radial bearing for the worm member 22. It also furnishes a means for taking the thrust of the worm member 22 by engaging a pair of needle thrust bearings 65 and 66 positioned on either side thereof.

The needle thrust bearing 66 engages the fixed plate 62 and a shoulder 67 on the worm member 22, while the other needle thrust bearing arrangement 65 engages the fixed plate 62 and a threaded collar 69 threaded on the worm member 22. The thrust and radial bearing arrangement 61 thus accurately positions and secures the worm member 22 rotatably within a housing 11 of the power steering gear 10.

The antifriction bearing assembly 33 may be adjusted on a line that is perpendicular to and that intersects the axis of the worm member 22 so that each of the ball followers 31 and 32 properly engage in the grooves 27 and 28 of the worm member 22. This is done when the gear is in the on-center position as shown. Since there is considerable distance between the thrust and radial bearing arrangement 61 and the ball followers 31 and 32 when the gear is in the on-center position, the worm member 22 may flex if necessary to provide proper contact of the ball followers 31 and 32 without in any way harming or interfering with the operation of the gear. This adjustment thus compensates for manufacturing tolerances and errors that may cause misalignments of the worm with respect to the ball followers.

Figures 2, 3:
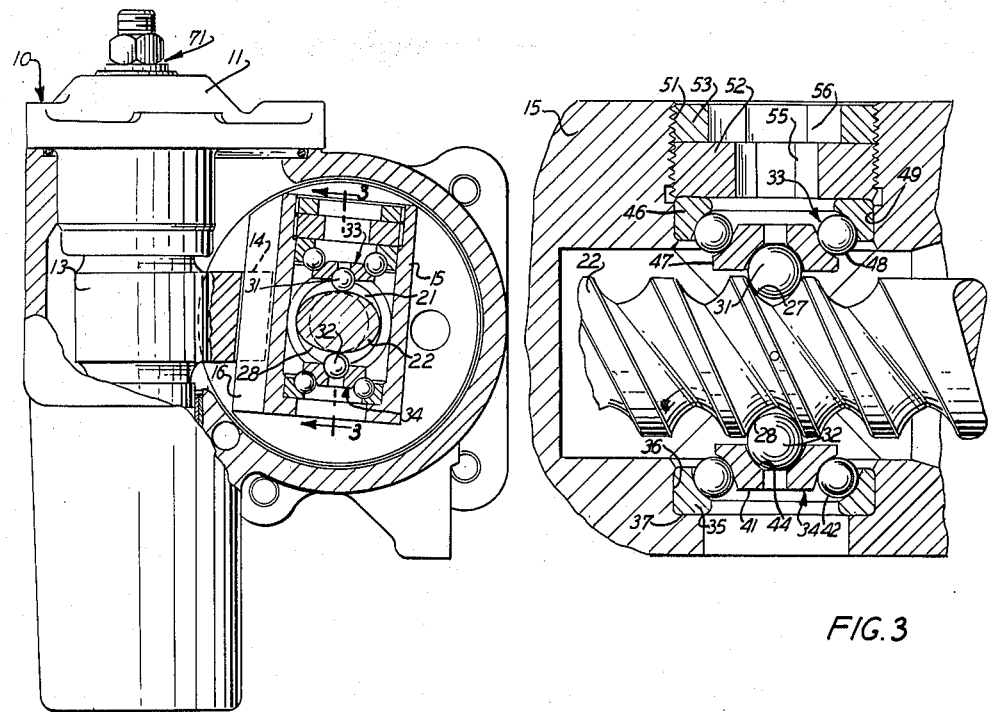
FIGURE 2 is a sectional view partially in elevation taken along the lines 2—2 of FIGURE 1.
FIGURE 3 is an enlarged sectional view partially in elevation taken along the lines 3—3 of FIGURE 2.

The remainder of the gear may be of conventional construction. As shown in FIGURE 2, a standard lash adjusting mechanism 71 may be used to shift the output shaft 13 axially in the housing 11 and relative to the inclined teeth on the rack 16 to provide an initial lash adjustment of the sector gear 14 and the rack 16.

The fluid valve 24 directs fluid under pressure to the power piston 15 to assist in steering operations when the torque on the input shaft 21 exceeds a predetermined value. Basically, this valve comprises a first rotary valve plate 75 and a second rotary valve plate 76 that are biased to a neutral position by means of a C-spring 77. Fluid enters the inlet port 82 under pressure and is fed to an annular chamber 83 and then to the first rotary valve plate 75 through a sealing piston member 84. Relative rotation of the two rotary valve plates 75 and 76 against the bias of the C-spring 77 occurs when sufficient torque is supplied to the input shaft 21 to call for power assist. This torque causes relative rotation between the input shaft 21 to which the rotary plate 75 is attached by means of keying 85, and the worm member 22 to which the rotary valve plate 76 is attached by means of keying 86. This fluid control valve is more fully disclosed in co-pending application S.N. 248,930, filed January 2, 1963, now Patent 3,227,178 in the name of John R. Elwell and assigned to the assignee of this invention.

When torque above the predetermined amount, sufficient to call for power assist, is applied to the input shaft 21 in one direction, for example, in a direction to execute a righthand turn, relative rotation occurs between the rotary valve plates 75 and 76 so that fluid under pressure is fed to the chamber 91 positioned on one side of the piston ring 92. This is done through the conduits 93, 94 and 95. At the same time, fluid is exhausted from the chamber 97 that forms the remainder of the interior of the housing 11. This is done through conduit 101, through the rotary valve plates 75 and 76, through an internal annular cavity 102, and the outlet port 103.

When torque above the predetermined amount, torque sufficient to call for power assist, is applied to the input shaft 21 in the other direction, it can readily be appreciated that fluid under pressure flows from the input port 82 to the chamber 97, through the valve 24 and conduits previously described, and that fluid is exhausted from the chamber 91 by means of the valve 24 and the conduits previously described.

As the worm member 22 rotates, the ball followers 31 and 32 roll about an axis that is generally parallel to the lead angle of the grooves 27 and 28 in the worm member 22 at the points where the ball followers contact the worm. The inner race buttons 41 and 47 of the antifriction bearing assemblies 33 and 34 roll about the line previously described, that is a line that is perpendicular to and intersects the axis of the worm member 22.

Since the two ball followers 31 and 32 are fixed relative to the piston 15 by the antifriction ball assemblies 33 and 34, the piston travels axially with a motion determined precisely by the lead angles of the grooves 27 and 28 in the worm member 22. That is, the piston member 15 follows the worm member 22 in a precise fashion and the steering wheel of the vehicle attached to the worm through the input shaft 21 will have the same on-center position regardless of how much steering has taken place. This is an important feature with steering wheels that are styled, or designed, to have a definite on-center position.

It can readily be seen that the forces on the worm are substantially balanced except for the thrust force that moves the piston 15 in response to rotation of the worm member 22. The separating forces tending to separate the ball followers from the worm member are equal and are in opposite directions. Similarly, the thrust force of each of the ball followers acts on a line which is parallel to the axis of the worm. The distance of the lines of action for the ball followers are equally spaced from the axis of the worm and, therefore, there is no turning moment on the worm that would tend to turn it about its axis.

The present invention may thus be used with either a manual steering gear or a power steering gear. In the manual steering gear there may be a direct connection between the input shaft 21 and the worm member 22, and the rotary motion applied to the input shaft results, through the ball follower arrangement, in reciprocatory motion of the output member that preferably includes the rack 16 as illustrated. This reciprocatory motion is then converted to rotary motion at the output shaft 13 through the rack 16 and the sector gear 14 on the output shaft 13. With the power steering gear described and illustrated this action is power assisted by the use of fluid under pressure directed to either side of the power piston 15 (either chamber 91 or 97) by the fluid control valve 24.

Figure 4:
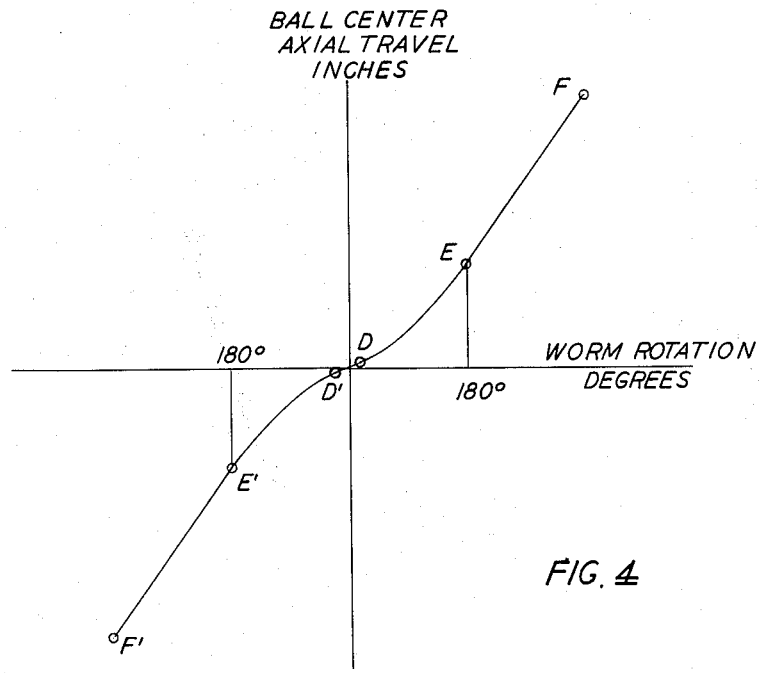
FIGURE 4 is a graph showing the axial travel of the ball followers plotted against degrees of worm rotation.
Figure 5:
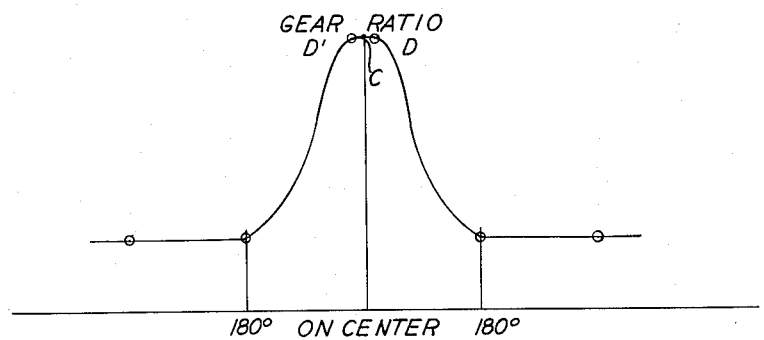
FIGURE 5 is a graph disclosing how the gear ratio of the gear varies in relation to the position of the steering wheel of the vehicle.

In either the manual or the power steering gear the axial travel of the ball followers 31 and 32 as a function of the rotation of the worm member 22 is shown in FIGURE 4. It can be seen that the axial travel of the ball followers is the least in the on-center position of the gear for a given amount of worm rotation and that it is the greatest at the end positions of the worm after the worm has been rotated through 180° either side of center. This results in the variable ratio gear with the ratio varying as the worm is turned from the on-center position as shown in FIGURE 5. The gear ratio is thus a maximum at the center position of the gear and decreases to a point 180° either side of center. From the position 180° either side of center the gear ratio is fixed out to the locked position of the steerable road wheels.

The present invention thus provides a variable ratio steering gear that can readily be adjusted to compensate for manufacturing tolerances and in which the forces on the worm are substantially balanced. In addition, the fixed location of the ball followers in the output member assures a fixed center position for the steering wheel of the vehicle.

It will be understood that the invention is not to be limited to the exact construction shown and described and that various changes and modifications may be made without departing from the spirit and scope of the invention as defined in the appended claims.

We claim:
1. A variable ratio power steering gear comprising a casing, a power piston mounted for reciprocatory motion in said casing, an ouput shaft mounted in said casing perpendicularly offset from said power piston, means coupling said power piston and said output shaft for converting reciprocatory motion of said power piston to rotary motion of said output shaft, a worm mounted concentrically within said power piston, an input shaft mounted in said casing coaxially with said worm, means coupling said worm and said input shaft for transmitting rotary motion of said input shaft to rotary motion of said worm and for applying fluid under pressure to either side of said power piston when the torque on said input shaft exceeds a predetermined value, said worm including a first variable lead groove and a second variable lead groove, said first and said second variable lead grooves being positioned diametrically opposite on said worm and having identical lead angles at every section normal to the worm axis, the lead angle of each of said grooves being a minimum in the center and increasing toward each end, a first ball follower positioned in said first variable lead groove in said worm and a second ball follower positioned in said second variable lead groove in said worm, said second ball follower being displaced 180° around the periphery of said worm from said first ball follower, a first antifriction bearing assembly carried by said power piston and supporting said first ball follower, and a second antifriction bearing assembly carried by said power piston and supporting said second ball follower, said first antifriction bearing assembly being positioned diametrically opposite said first antifriction bearing assembly on a line that is perpendicular to and that intersects the axis of said worm.

2. The combination of claim 1 in which means are provided for adjusting one of said antifriction bearing assemblies along said line that is perpendicular to and that intersects that axis of said worm.

References Cited by the Examiner

UNITED STATES PATENTS

| | | | |
|---|---|---|---|
| 1,493,999 | 5/1924 | Lombardi | 308—166 |
| 3,033,051 | 5/1962 | Reinke et al. | |
| 3,169,407 | 2/1965 | Newell | 74—424.8 |

FOREIGN PATENTS

| | | |
|---|---|---|
| 229,099 | 6/1960 | Australia. |

MILTON KAUFMAN, *Primary Examiner.*